No. 636,490. Patented Nov. 7, 1899.
J. H. & G. H. CLIFF & T. D. WARDLAW.
ACETYLENE GAS GENERATOR.
(Application filed June 22, 1898.)
(No Model.) 2 Sheets—Sheet 1.
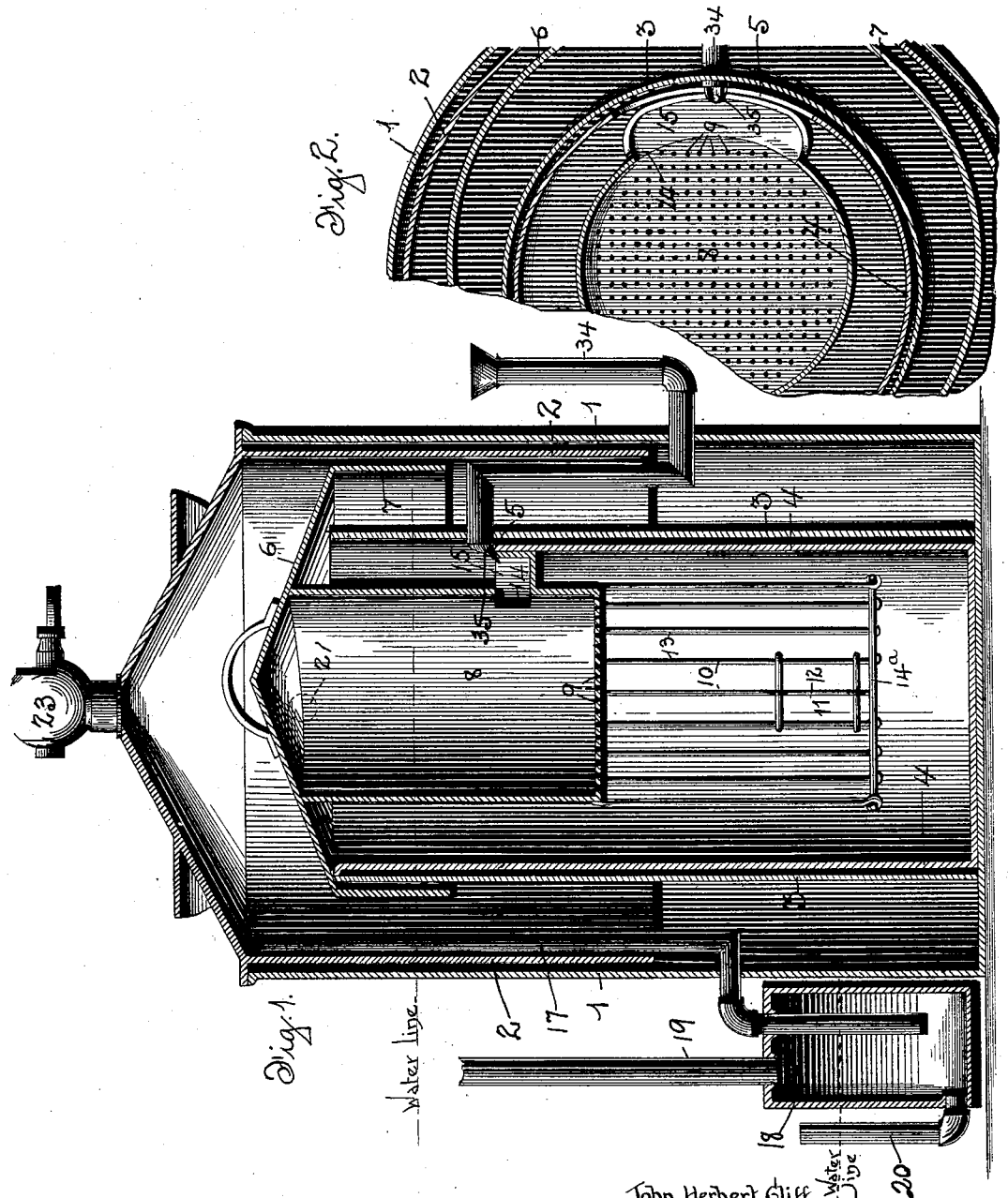
Witnesses:
John Herbert Cliff,
George Henry Cliff and
Thomas Davidson Wardlaw, Inventors
By Marion Marion
their Attorneys

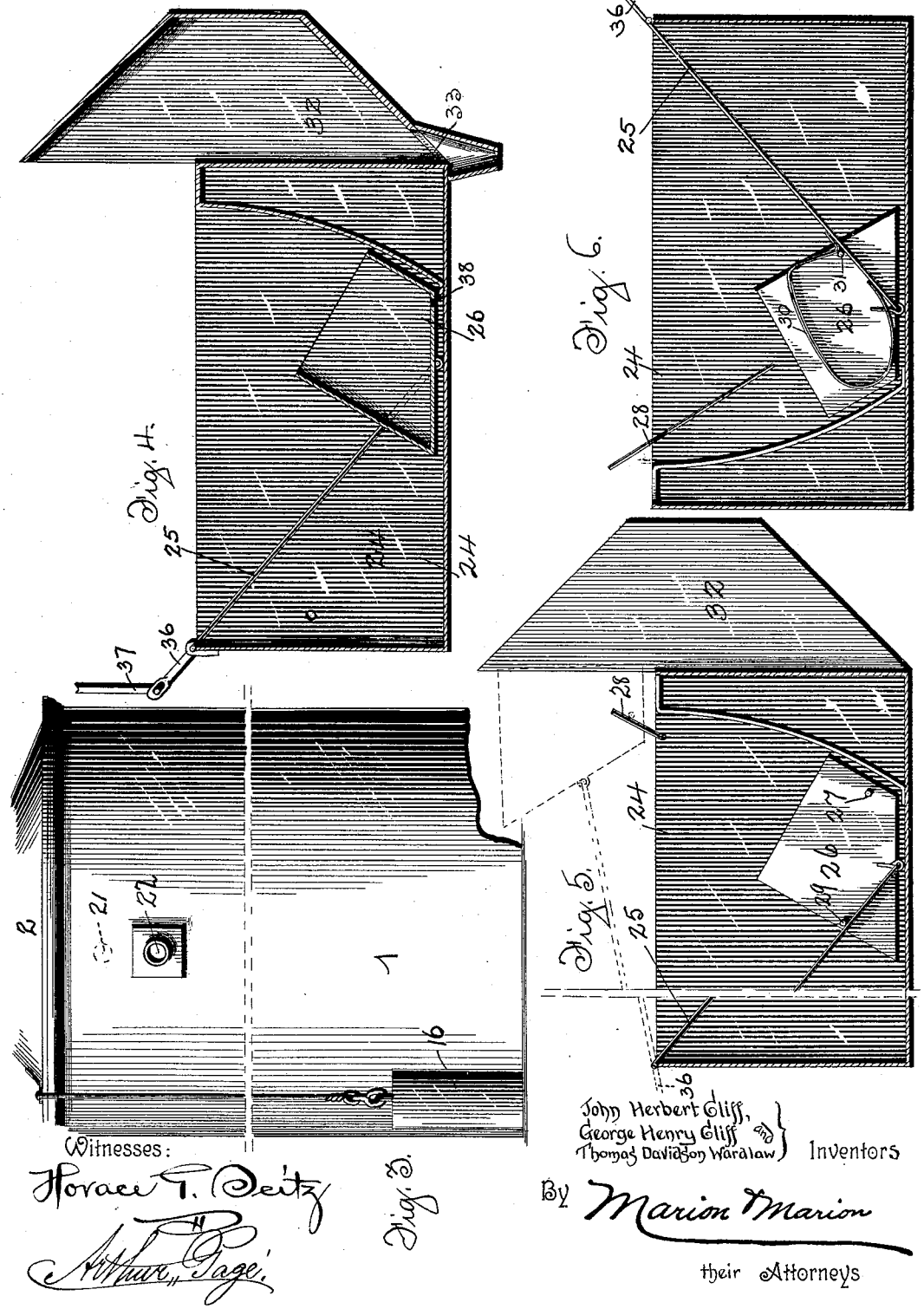

UNITED STATES PATENT OFFICE.

JOHN HERBERT CLIFF, GEORGE HENRY CLIFF, AND THOMAS DAVIDSON WARDLAW, OF DUNDAS, CANADA, ASSIGNORS TO JOHN BROWNLIE HAMILTON, OF SAME PLACE.

ACETYLENE-GAS GENERATOR.

SPECIFICATION forming part of Letters Patent No. 636,490, dated November 7, 1899.

Application filed June 22, 1898. Serial No. 684,187. (No model.)

*To all whom it may concern:*

Be it known that we, JOHN HERBERT CLIFF, GEORGE HENRY CLIFF, and THOMAS DAVIDSON WARDLAW, subjects of Her Majesty the Queen of Great Britain, residing at Dundas, in the county of Wentworth, Province of Ontario, Canada, have invented certain new and useful Improvements in Acetylene-Gas Generators; and we do hereby declare the following to be a full, clear, and exact description of the invention, such as will enable others skilled in the art to which it appertains to make and use the same.

Our invention relates to improvements in acetylene-gas-generating machines.

The object of our invention is to provide a device of this character in which the water-supply to the carbid is automatically regulated and in which the ashes of the carbid are automatically shaken from the carbid-receptacle.

A further object is to provide a machine in which the gas is automatically washed and cleaned before its passage into the gas-tank and also to provide the gas-holder with means for keeping the contents cool, and thus obviate all danger of explosion.

A further object is to provide a device in which the water will be evenly distributed over the carbid.

A further object is to provide a device of this character which is neat and attractive in appearance, durable in construction, and simple in operation.

Our invention consists in the improved construction and combination of parts hereinafter fully described, and particularly pointed out in the appended claims.

In the drawings, in which similar numerals of reference indicate corresponding parts in all of the views, Figure 1 is a vertical sectional view of one of our improved generating-machines. Fig. 2 is a horizontal sectional view of the same. Fig. 3 is a side elevation. Fig. 4 is a sectional view of the water-reservoir and the apparatus contained therein for automatically supplying the water to the carbid. Fig. 5 is a similar view showing one side of the apparatus in the reservoir. Fig. 6 is a similar view showing the opposite side.

The essential elements of an acetylene-gas-generating machine must consist of a device which combines safety, automatic operation, and purification of the gas formed. While many of these devices have been produced, yet none have fulfilled these requirements to the best advantage, and it is to provide a perfect device of this character that the construction hereinafter described is presented.

1 designates an outer casing in which is received a telescopic section 2, which is adapted to close the top of the casing 1, water located within the casing 1 to a suitable height forming a seal to prevent the escape of gas. Mounted within the casing 1 and secured thereto, if desired, is an inner casing 3, extending upward to a distance above the water-level of the contents of the casing 1 and to within a short distance of the top of the section 2. The casing 3 is open at its top and is adapted to receive an ash-receptacle 4. (Best shown in Figs. 1 and 2.) The ash-receptacle 4 has one of its sides cut away, as at 5, for a purpose hereinafter described.

6 designates a cover which is adapted to rest on the top of the inner casing 3 and ash-receptacle 4, the cover being of a larger diameter than that of the casing 3, its position being eccentric to that of said casing. The cover 6 is provided with a depending flange 7, which extends downward outside of said casing 3 to a point a short distance below the water-line of the casing 1. Secured eccentrically to the under side of the cover 6 and extending downwardly therefrom is a water-chamber 8, having its bottom provided with suitable perforations 9, through which the water is adapted to percolate onto the carbid, which is located in a suitable basket 10, located underneath said chamber 8 and adapted to have movement therewith, as hereinafter described, said basket being provided with a suitable opening 11, normally held closed by means of a gate 12, slidably or otherwise mounted on said basket. The basket is preferably formed with vertical wires 13 and horizontal wires $14^a$, thus making a light and cheaply-constructed receptacle; but it is to be understood that we do not limit ourselves to this precise construction, but may use any suitable basket which will serve the purpose for which it is intended.

The chamber 8 is provided at one side with an opening 14, about which is arranged a segmental pan 15, adapted to receive the water from the supply and allow it to pass into the chamber 8.

From this construction it will be apparent that with the parts in the position shown in Fig. 1 when water is passed into the pan 15 it will pass into the chamber 8 and through perforations 9 onto the carbid located in the basket 10, thus forming gas, which is confined within the chamber formed by the ash-receptacle 4 and cover 6. As the lower edge of the flange 7 extends below the water-line in the casing 1, it will be obvious that a water seal will be formed between the flange 7 and inner casing 3, which will prevent the escape of gas from the receptacle 4 until sufficient gas is formed therein to cause the cover to be raised off its seat to a point close to the water-line, when the pressure of the gas within will cause it to be forced into and through the water seal, from where it passes into the space inside of the section 2 above the water-line, the gas during its passage through the water being washed and cleaned. When the gas has passed from the receptacle 4, the cover will again fall into position with sufficient force to shake the ashes from the carbid into the receptacle, thus exposing a fresh surface to the action of the water. In practice we have found that this raising and dropping of the cover 6 will be so rapid as to cause it to have a rocking movement, which aids in shaking off the ashes. When sufficient gas has been received into the chamber above the water-level, causing the section 2 to be raised against the action of weights 16, (best shown in Fig. 3,) detachably secured to said section, it is forced into a downwardly-extending pipe 17, having its inlet located near the top of the chamber in the section 2, and into a suitable water-trap 18, located at a suitable point outside of said casing 1, the gas being forced through the water by reason of the pressure, and again subjecting it to a washing and cleansing process, said trap also serving to prevent the return of gas to the chamber. From the trap 18 the gas is passed to the point of consumption or a gas-tank, if desired, by means of pipe 19, leading from the trap. A pipe 20, secured to the trap, serves to allow for escape of water or for its passage into the trap, as may be necessary, a water seal being formed to prevent the escape of gas therefrom.

The casing 1 is provided with a suitable opening 21, through which water is adapted to be passed, preferably in the form of a stream, between the casing 1 and the section 2, by means of which the contents of the section will remain cool, the water escaping by means of a suitable opening 22, formed in the casing 1. A valve 23 is formed at the top of the section 2, by means of which the section 2 may be readily removed, the valve negativing all tendency to the formation of a vacuum above the water-line. Suitable handles are also provided by means of which the section 2 and cover 6 can be readily removed when desired.

As it is preferable that the machine will generate gas as needed, it is necessary that the water-supply be regulated to pass water to the carbid only when the supply of gas is not great, and to provide for this we have applied the following construction: A tank 24 of suitable size is secured to the gas-holder or gas-tank (not shown) and is connected by suitable means with the water in said tank, so that the water in the tank will be the same height as that in the gas-tank. At one end of the tank 24 is pivotally mounted a bail 25, which extends into the tank and on which is pivotally mounted a tilting receptacle 26, preferably made as shown in the drawings, being arranged in such manner as when the bail is raised the receptacle 26 will be carried upward with a supply of water, the receptacle when at or near the top of the tank being tilted forward by reason of the pin 27, secured at one side of the receptacle, riding against one face of an inclined rod 28, secured to said tank, the position assumed by the receptacle being shown in dotted lines in Fig. 5. To enable the receptacle to be carried upward, suitable pins 29, secured to the sides of the receptacle, are provided, these pins resting on the bail as the receptacle is carried upward. To limit the tilting movement of the receptacle, a suitable guide 30 is provided on one side of said receptacle, said guide when the receptacle has reached its proper position in tilting being contacted with by a pin 31, secured to the receptacle. When the bail is again lowered, the rod 28 will cause the receptacle to be tilted to its proper position. After the water has been raised by the receptacle it is dumped into an auxiliary chamber 32, secured at one end of said tank, from where it is passed through an opening 33 and connections (not shown) to a suitable siphon-trap 34, the inner end of which delivers the water into the segmental pan 15. If desired, a flexible extension 35 may be provided to better conduct the water to the pan. To raise and lower the receptacle as necessary, we provide the bail 25 with an arm 36, connected by a suitable link connection 37 with the top section of the gas-tank. By this construction it will be seen that when the gas-supply is full the top of the gas-tank will be in its raised position, thus leaving the receptacle 26 in its lower or inoperative position, where it is being filled. As the gas in the gas tank or holder is used the top section will pass downward, thus raising the receptacle, and furnish a new supply of water to the carbid, as before set forth. An opening 38, formed in the receptacle 26, will serve to aid in filling the receptacle and will also, if the gas consumption is slow, provide means for a partial escape of water from the receptacle during its upward movement, thus supplying a less amount of water to the carbid. We have thus provided an automatically-regulated water-supply which is governed entirely by the gas consumption—the greater the consumption the larger the amount of water delivered to the carbid.

While we have described the water-supply as secured to the gas holder or tank, it is to be understood that the same may be placed independent of said tank, having a separate source of supply. The weights 16 also form a safety-valve for the section 2, as an accidental excess generation of gas will cause the section to be raised a sufficient distance to allow of the escape of the gas, and thus prevent an explosion.

When the water-supply has communication with the water in the gas-holder, it will be readily seen that when the water in the tank passes below a fixed point no further supply of water will pass to the receptacle, and no gas will be formed until the water has again been raised to its proper height, thus forming an additional safeguard.

Having now described our invention, what we claim as new is—

1. An acetylene-gas generator, comprising inner and outer casings; a cylindrical ash-receptacle removably located within the inner casing; a reservoir within said ash-receptacle, having a perforated bottom, an elongated slot and a segmental flange; a depending basket secured to said reservoir said basket being composed of vertical and horizontal bars; means for connecting the generator with suitable pipes to convey the gas to a tank; a trap located in the path of said connections; means for feeding water or other liquid to the reservoir, and means for cooling said generator, substantially as described.

2. An acetylene-gas generator, comprising inner and outer cylindrical casings; a cylindrical ash-receptacle removably located within the inner casing; a reservoir within said ash-receptacle having a depending basket secured thereto, said reservoir and basket being so constructed that the action of the gas will agitate the basket; means for evenly distributing the contents of said reservoir to the basket; a pipe connecting the generator with a drum-shaped trap, said trap being adapted to receive and retain the moisture contained in the gas; a waste-pipe secured to said trap, together with a connection for conveying gas to a suitable tank; a feed-pipe communicating with said reservoir; and pipes for conveying running water to and from the space between the inner and outer sections, substantially as described.

3. In an acetylene-gas generator, the combination with an outer casing containing water, a part telescoping within said casing for closing said outer casing and extending into the water, an inner casing as 3 in which gas is to be generated, a movable cover for said casing which is periodically raised by the gas when it escapes from said casing and allowed to drop after the escape of gas, and means for generating gas located within said inner casing and comprising a foraminous receptacle which contains the carbid that is connected with said cover so that when the cover is raised and dropped, the ash will be separated from the carbid, substantially as described.

4. In an acetylene-gas generator, the combination with an outer closed casing containing water, an inner casing, a movable cover for said casing which is periodically raised by the gas when it escapes from said casing and allowed to drop, means for generating gas located within said inner casing and connected with said cover, said means comprising a chamber 8 having a perforated bottom, and a foraminous basket containing the carbid suspended from said chamber, and a suitable means for supplying water to said chamber, substantially as described.

5. In an acetylene-gas generator, the combination of a closed outer casing containing water, an inner casing in which gas is generated, a movable cover for said casing and extending into the water so as to have a water seal between it and the said inner casing through which seal the gas passes when escaping from the inner casing to the outer casing, means for generating gas located within said casing, a chamber adjacent the outer casing containing water, a pipe leading from the outer casing into the water in said chamber, and a pipe leading from said chamber to a reservoir, substantially as described.

6. A generating-chamber for acetylene-gas generators comprising a casing, a cover for said casing adapted to be periodically raised by the gas escaping from said casing and to fall after the gas has escaped, a reservoir within said casing secured to said cover, a perforated bottom for said reservoir, a carbid-receptacle beneath said bottom, and automatic means for introducing liquid to said reservoir, substantially as described.

7. An acetylene-gas generator comprising an outer casing, a telescoping part for said casing, a generating-chamber located within said casing, means operated by the movement of the telescoping part for supplying liquid to the generating-chamber, said means comprising a tank, a receptacle within said tank, a bail to which said receptacle is pivoted and which is operated by the telescoping part so as to raise and lower the receptacle as the telescoping part moves, and means carried by the tank and receptacle for tilting the receptacle as it is raised to the top of the tank, substantially as described.

In witness whereof we have hereunto set our hands in the presence of two witnesses.

JOHN HERBERT CLIFF.
GEORGE HENRY CLIFF.
THOMAS DAVIDSON WARDLAW.

Witnesses:
HORACE G. SEITZ,
G. KERWIN.